US007587053B1

(12) United States Patent
Pereira

(10) Patent No.: US 7,587,053 B1
(45) Date of Patent: Sep. 8, 2009

(54) AUDIO-BASED POSITION TRACKING

(75) Inventor: Mark Pereira, Livermore, CA (US)

(73) Assignee: NVIDIA Corporation, Santa Clara, CA (US)

( * ) Notice: Subject to any disclaimer, the term of this patent is extended or adjusted under 35 U.S.C. 154(b) by 995 days.

(21) Appl. No.: 10/695,684

(22) Filed: Oct. 28, 2003

(51) Int. Cl.
*H04B 3/00* (2006.01)

(52) U.S. Cl. .......................... 381/77; 381/79; 381/387; 381/91; 381/92

(58) Field of Classification Search .................. 381/92, 381/17–18, 58, 71.1, 91, 122, 94.1, 77–81, 381/310, 300, 303, 56, 104, 74, 26, 309, 381/82, 387; 340/943, 384.1, 384.2, 7.57, 340/7.62; 367/16, 118, 127, 129
See application file for complete search history.

(56) References Cited

U.S. PATENT DOCUMENTS 4,695,953 A * 9/1987 Blair et al. .................... 463/3
5,174,759 A * 12/1992 Preston et al. ............. 434/317
5,220,922 A * 6/1993 Barany ...................... 600/437
6,176,837 B1 * 1/2001 Foxlin ....................... 600/595
6,445,364 B2 * 9/2002 Zwern ......................... 345/8
6,856,876 B2 * 2/2005 Breed et al. .................. 701/47
7,012,630 B2 * 3/2006 Curry et al. ........... 379/202.01
7,016,505 B1 * 3/2006 Nakadai et al. ........... 381/71.1
7,130,430 B2 * 10/2006 Milsap ....................... 381/77
7,227,960 B2 * 6/2007 Kataoka ..................... 381/92
2002/0034310 A1 * 3/2002 Hou ........................... 381/92
2002/0090094 A1 * 7/2002 Amir et al. .................. 381/92
2002/0143414 A1 * 10/2002 Wilcock ..................... 700/94
2002/0181723 A1 * 12/2002 Kataoka ..................... 381/92
2003/0142829 A1 * 7/2003 Avigni ........................ 381/26
2004/0213419 A1 * 10/2004 Varma et al. ................ 381/92
2005/0036631 A1 * 2/2005 Feit et al. ..................... 381/86
2005/0047611 A1 * 3/2005 Mao ......................... 381/94.7

* cited by examiner

*Primary Examiner*—Vivian Chin
*Assistant Examiner*—Disler Paul

(57) ABSTRACT

Embodiments of the present invention provide an audio-based position tracking system. The position tracking systems comprises one or more speakers, an array of microphones and a computing device. The speaker is located at a fixed position and transmits an audio signal. The microphone array is mounted upon a moving object and receives the audio signal. The computing device determines a position of the moving object as a function of the delay of the audio signal received by each microphone in the array.

19 Claims, 4 Drawing Sheets

(TOP VIEW)

(SIDE VIEW)

AUDIO-BASED POSITION TRACKING

FIELD OF THE INVENTION

Embodiments of the present invention relate to tracking the position and/or orientation of a moving object, and more particularly to an audio-based computer implemented system and method of tracking position and/or orientation.

BACKGROUND OF THE INVENTION

Traditionally, audio-based tacking methods have been limited to determining the location of a moving sound source. Such methods comprise mounting a sound source on a moving object. The location of the moving object is determined by tracking the audio signal by utilizing an array of microphones at known fixed locations. The sound source (e.g., speakers) requires power to generate the necessary audio signals. The sound source is also relatively heavy. Therefore, conventional audio-based tracking methods have not been utilized for head tracking applications such as gaming environments and the like.

Head tracking has been utilized in three dimensional animation, virtual gaming and simulators. Conventional computer implemented devices that track the location of a user's head utilize gyroscopes, optical systems, accelerometers and/or video based methods and systems. Accordingly, they tend to be relatively heavy, expensive and/or require substantial processing resources. Therefore, it is unlikely that any of the prior art systems would be used in the gaming environment due to cost factors.

SUMMARY OF THE INVENTION

Embodiments of the present invention are directed toward a system and method of tracking position and/or orientation of an object (e.g., user's head) utilizing audio signals. In one embodiment, the system comprises a computing device, a stereo microphone (e.g., two microphones) and a stereo speaker system (e.g., two speakers). The stereo microphones may be mounted on the object (e.g., user). The stereo speakers are generally positioned at fixed locations (e.g., on top of a table or desk). A computer generated sine wave is transmitted from the stereo speakers to the stereo microphones. The system can determine the position (e.g., between the speakers) and/or the orientation (e.g., one or more planes) of the speaker array. The position and/or orientation of the object is determined as a function of the time delay between the audio signals received at each microphone. Therefore, the position and/or orientation of the user's head can be determined and tracked in real-time by the system.

In one embodiment, the tracking system comprises one or more speakers, an array of microphones and a computing device. The speaker may be located at a fixed position and transmits an audio signal (e.g., sine wave or any other wave of known pattern). The microphone array is mounted upon an object and receives the audio signal. The computing device comprises a sine wave generator, a delay comparison engine and a position/orientation engine, all of which may be implemented in a computer system or game console unit. The sine wave generator is communicatively coupled to the speakers. The delay comparison engine is communicatively coupled to the array of microphones. The position/orientation engine is communicatively coupled to the delay comparison engine. The position/orientation engine determines a position and/or orientation of the object as a function of the delay of the audio signal received by each microphone in the array. In one embodiment, the position and/of orientation information can be determined in real-time and provided to a software application for real-time response thereto.

In one embodiment, the method of tracking a position comprises transmitting an audio signal from a speaker. The audio signal is received at a plurality of microphones. A delay of the received audio signal is determined for each of the plurality of microphones. A real-time relative position and/or orientation of the plurality of microphones is determined as a function of the determined delay.

In accordance with embodiments of the present invention, the determined position and/or orientation may be utilized as an input of a computing device or software application. For example, the determined position and/or orientation may be utilized for feedback in a simulator or virtual reality gaming application, or to control an application executing on the computing device. In addition, the determined position and/or orientation may also be utilized to control the position of a cursor (e.g., pointing device or mouse) of the computing device. Accordingly, a headset containing an array of microphones may allow a user having a mobility impairment to operate the computing device. The computing device may be a personal computer, a gaming console, a portable or handheld computer, a cell phone or any other intelligent unit.

Furthermore, embodiments of the present invention are advantageous in that the microphone array is lightweight, requires very little power, and is inexpensive. Moreover, this equipment is consistent with many existing gaming applications. The low power requirements and the lightweight of the microphone array is also advantageous for wireless implementations. Furthermore, the high frequency of the sine wave advantageously provides sufficient resolution and reduces latency of the position and/or orientation calculations. The high frequency of the sine wave is also resistant to interference from other computer and environmental sounds.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
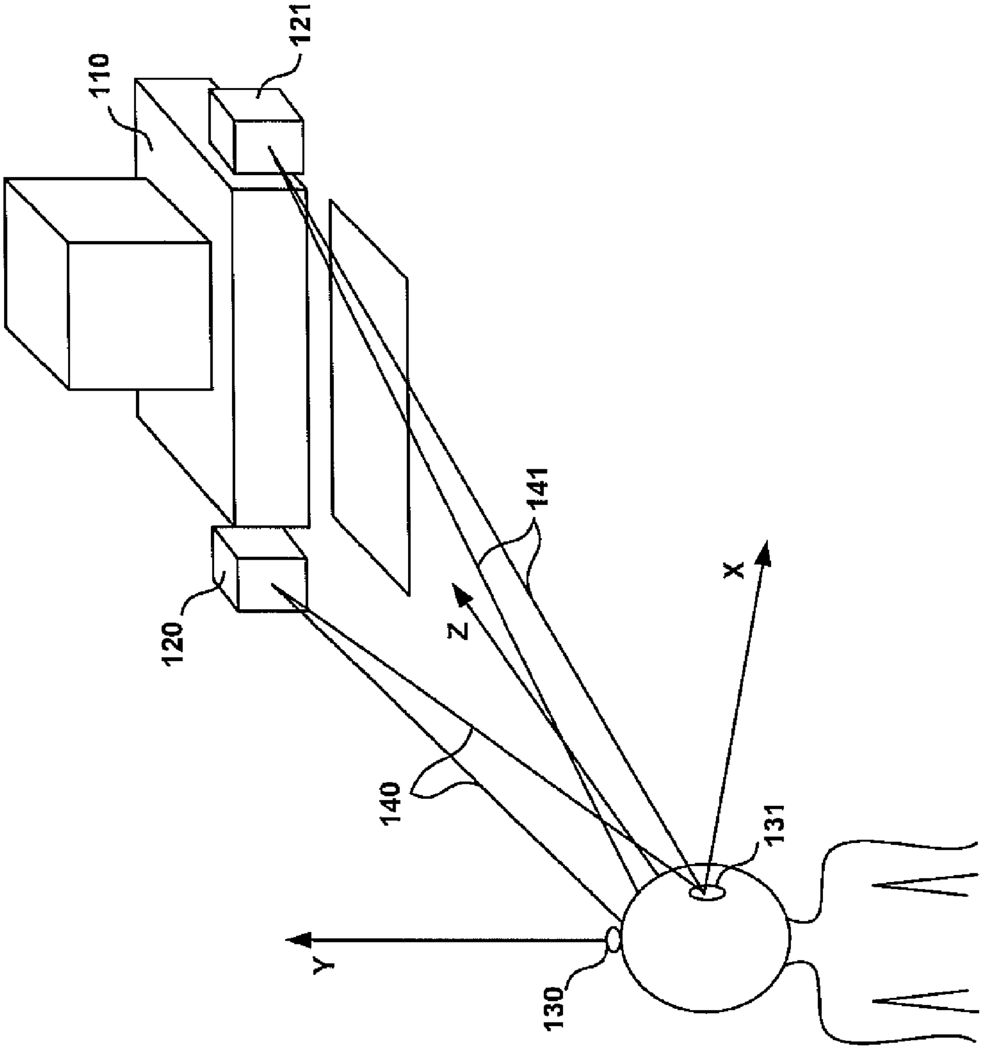
FIG. 1 shows a block diagram of an audio-based position and orientation tracking system, in accordance with one embodiment of the present invention.

Referring to FIG. 1, a block diagram of an audio-based position and orientation tracking system, in accordance with one embodiment of the present invention, is shown. As depicted in FIG. 1, the audio-based tracking system includes a computing device 110, one or more speakers 120, 121 and an array of microphones 130, 131. The speakers 120, 121 are located at fixed positions and transmit a high frequency audio signal 140, 141. The high frequency signal 140, 141 is selected such that it is above the audible range of a user. In one implementation the audio signal is a sine wave between 14-24 kilo Hertz (KHz), which can typically be produced by conventional computing devices and speakers. In another implementation, the audio signal is a sine wave between 14-48 KHz, which is expected to be produced by the next generation of computing devices and speakers. Furthermore, the audio signal 140, 141 may be transmitted simultaneously with other audio signals (indicator sounds, music), with minimal interference. Although shown as external, the speakers 120 and 121 could be internal to the computing device 110.

The array of microphones 130, 131 is mounted upon an object (e.g., a user). The microphones 130, 131 are lightweight, require little power and are inexpensive. Thus, the microphone array is readily adapted for mounting upon the user (e.g., as a headset, etc.). The low power requirement and lightweight features of the microphones 130, 131 also readily enable wireless implementations. Although shown as a desktop computer, device 110 could be any intelligent computing device (e.g., laptop compute, handheld device, cell phone, gaming console, etc.).

Each microphone 130, 131 receives the audio signal 140, 141 transmitted from the one or more speakers 120, 121. The relative position and/or orientation of the object (e.g., the user's head) is determined as a function of the delay (e.g., time delay) between the audio signals 140, 141 received at each microphone 130, 131. This information is communicated back to device 110 by wired or wireless medium. Any well-known triangulation algorithm may be applied by the computing device 110 to determine the position and/or orientation of the microphones, and thereby the user. Accordingly, the triangulation algorithm determines the position and/or orientation as a function of the delay between the audio signals 140, 141 received at each microphone 130, 131. Determining position and/or orientation is intended to herein mean determining the position, location, locus, locality, place, orientation, direction, alignment, bearing, aspect, movement, motion, action and/or the relative change thereof, or the like.

In one implementation, the audio signal includes a marker. The marker may be a change in the amplitude of the sine wave for one or more cycles. Accordingly, the time is determined from the time lapse between a transmitted marker and the received marker. In another implementation, the audio signal does not include a marker. Instead, the delay is determined from the delay between the received audio signals and a reference signal, or between pairs of received audio signals.

Figure 2:
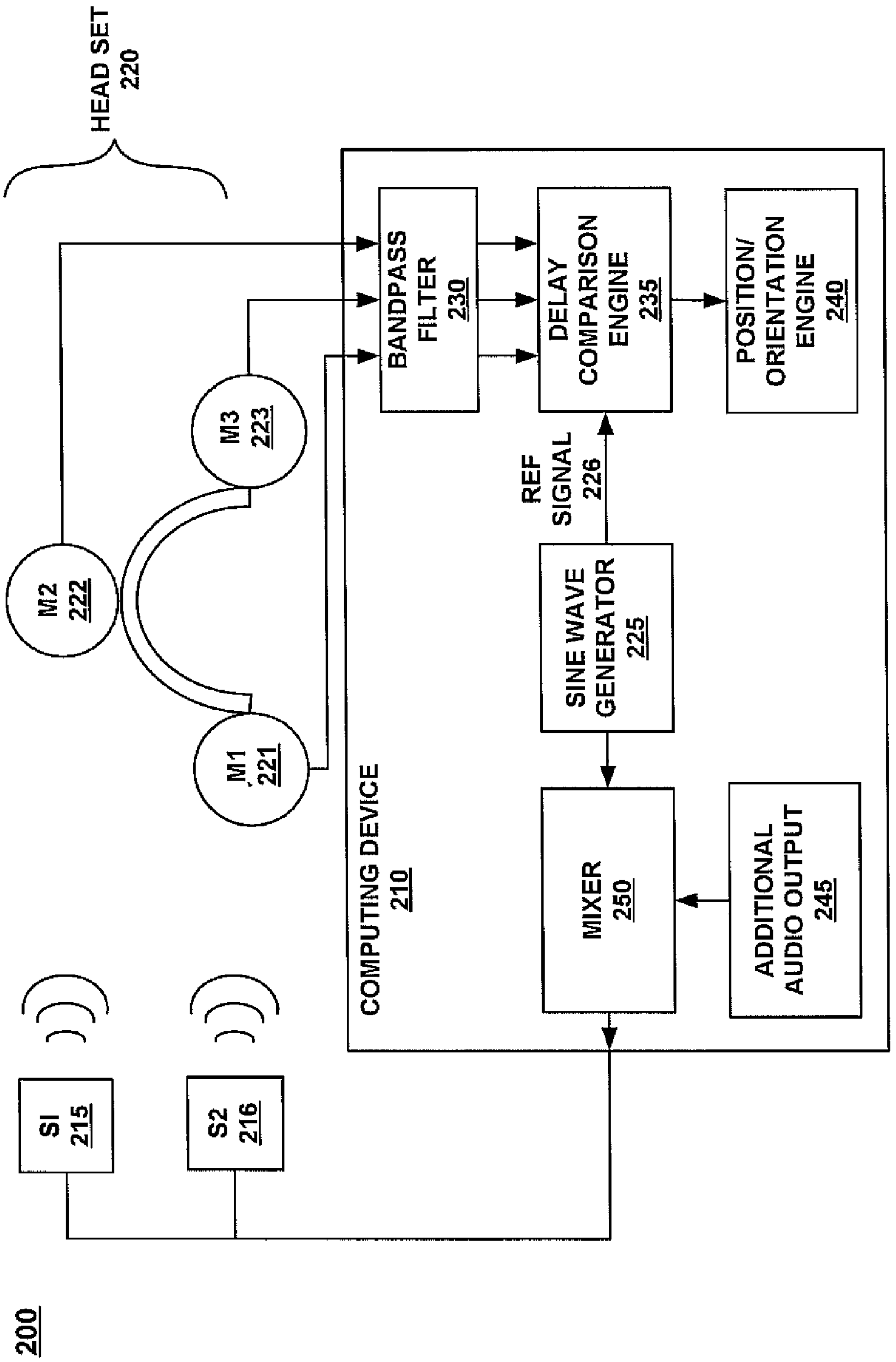
FIG. 2 shows a block diagram of a position and orientation tracking interface, in accordance with one embodiment of the present invention.

Referring now to FIG. 2, a block diagram of a position and orientation tracking interface 200, in accordance with one embodiment of the present invention, is shown. As depicted in FIG. 2, the tracking interface 200 comprises a computing device 210, a speaker 215 and a headset 220. The speaker 215 is located at fixed positions. The headset 220 comprises an array of microphones 221, 222, 223 and is adapted to be readily worn by a user.

The computing device 210 comprises a sine wave generator 225, a bandpass filter 230, a delay comparison engine 235 and a position/orientation engine 240. The sine wave generator 225 produces a sinusoidal signal having a frequency above the audible range of the user. The sine wave generator 225 is communicatively coupled to the speaker 215. Accordingly, the speaker 215 transmits the sinusoidal signal. The sinusoidal signal may be combined with one or more additional audio output signals 245 of the computing device 210 by a mixer 250. The sine wave generator 225 could be implemented in hardware or could be implemented in software.

The microphones 221, 222, 223 receive the sinusoidal signal transmitted by the speaker 215. Each microphone 221, 222, 223 receives the signal with a particular delay representing the length of a given path from the speaker 215 to each microphone 221, 222, 223. The length of each given path depends upon the position and/or orientation of each microphone 221, 222, 223 with respect to the speaker. In addition, the plurality of microphones 221, 222, 223 may provide for active noise cancellation.

Each microphone 221, 222, 223 is communicatively coupled to the bandpass filter 230. The bandpass filter has a pass band centered about the particular frequency of the sinusoidal signal utilized for determining position and/or orientation. Thus, the bandpass filter 230 recovers the sinusoidal signal from the signal received at the microphones 221, 222, 223, which may comprise the additional audio output signal that was mixed with the transmitted sinusoidal signal and any noise.

The bandpass filter 230 is communicatively coupled to the delay comparison engine 235. The delay comparison engine 235 determines the relative delay between the received sinusoidal signals for each pair of microphones in the array. In another implementation, the output of the sine wave generator 235 provides a reference signal 226 to the delay comparison engine 235. Accordingly the delay of each recovered sinusoidal signal is determined with respect to the reference signal.

The delay comparison engine 235 is communicatively coupled to the position/orientation engine 240. The position/orientation engine 240 determines the relative position and/or orientation of the headset 220 (e.g., user's head) as a function of the relative delay determined for each received sinusoidal signal. The position may be determined utilizing any well-known triangulation algorithm.

In another embodiment, the position-tracking interface comprises a plurality of speakers. The sine wave produced by the sine wave generator 225 is transmitted from a first speaker 215 for a first period of time, from a second speaker 216 for a second period of time, and so on, in a round robin manner. The sine wave transmitted by each of the speakers 215, 216 is received by the array of microphones 221, 222, 223.

Each received signal is bandpass filtered 230 to recover the sinusoidal signal for each period of time. The recovered sinusoidal signals, for each period of time, are compared by the delay comparison engine 235. The delay comparison engine 235 determines a delay of each recovered signal. The position/orientation engine 240 determines the position and/or orientation of the headset 220 as a function of the delay of the received sinusoidal signals as received by each microphone 221, 222, 223, during each period of time.

In another embodiment, the sine wave generator 225 produces a sine wave having a different frequency for transmission by a corresponding speaker 215, 216. More specifically, a first signal having a first frequency is transmitted from a first speaker 215, a second signal having a second frequency is transmitted from a second speaker, and so on. The sine wave having a given frequency transmitted by each of the speakers 215, 216 is received by the array of microphones 221, 222, 223.

Each received signal is bandpass filtered 230 to recover the sinusoidal signal of the given frequency. Each recovered sinusoidal signal is compared to a reference signal 226, having a corresponding frequency, by the delay comparison engine 235. Accordingly, the delay comparison engine 235 determines the delay (e.g., time delay) of each sinusoidal signal at each microphone 221, 222, 223. The position/orientation engine 240 determines the position and/or orientation of the headset 220 as a function of the delay of the received sinusoidal signals as received by each microphone 221, 222, 223.

It is appreciated that use of a sine wave provides for readily determining the delay of a signal. The use of a sine wave also provides for readily determining the time delay utilizing an amplitude-type marker.

It is also appreciated that conventional computer speaker systems may introduce clipping of the high frequency signal utilized to determined position and/or orientation. Therefore in one implementation, the sinusoidal signal is emitted from a dedicated sine wave transmitter instead of computer speakers. In another implementation, the sinusoidal signal and the additional audio output are attenuated in the mixer to prevent clipping.

Figure 3:
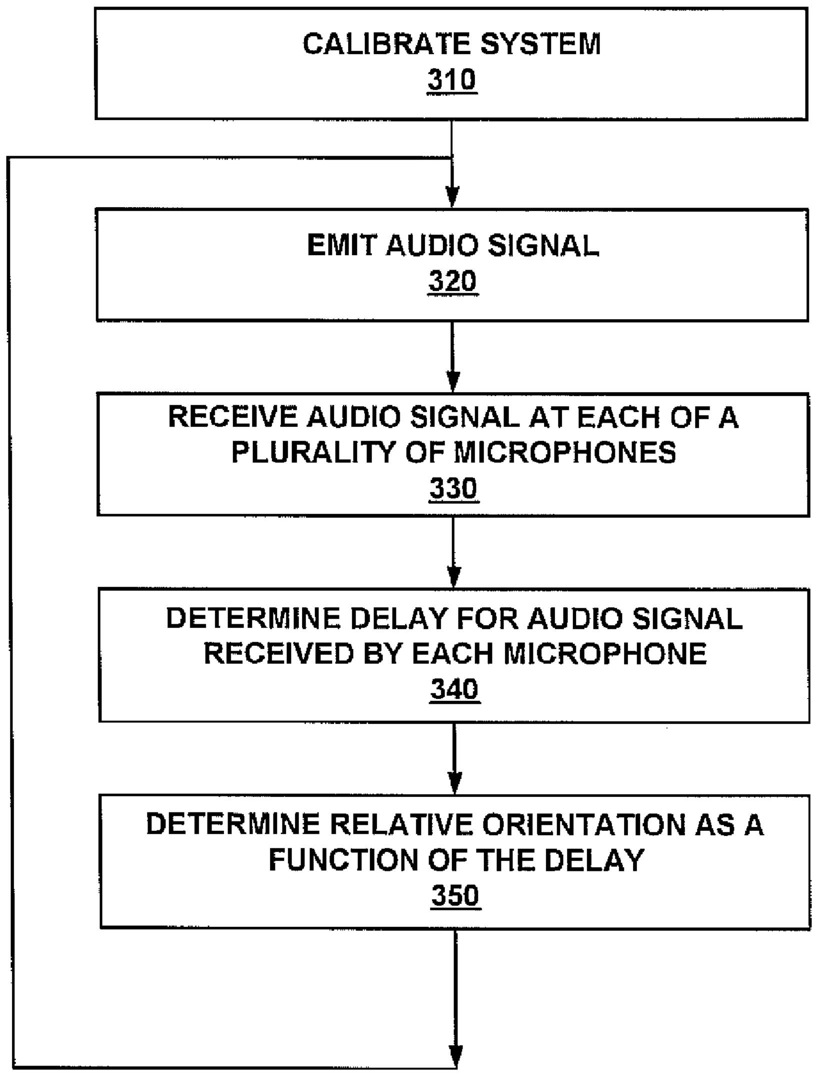
FIG. 3 shows a flow diagram of a computer implemented method of tracking a position and an orientation, in accordance with one embodiment of the present invention.

Referring now to FIG. 3, a flow diagram of a computer implemented method of tracking a position and/or orientation, in accordance with one embodiment of the present invention, is shown. As depicted in FIG. 3, the method of tracking begins with calibrating the system, at step 310. The calibration process comprises determining an initial position and orientation of an array of microphones relative to one or more speakers. In one implementation, the calibration can be done manually by placing the speakers and microphones at a known position and orientation with respect to each other. In another implementation, the calibration can be achieved utilizing markers in the sine wave form, which are spaced far enough apart, to determine the initial position and orientation.

At step 320, an audio signal is transmitted from one or more speakers. At step 330, the audio signal is received at each of a plurality of microphones. At step 340, a delay between receipt of the audio signal at each microphone is determined. At step 350, a relative position and/or orientation is determined as a function of the delay. The processes of 320, 330 340 and 350 are repeated periodically to obtain an updated position and/or orientation.

In one implementation, the audio signal includes a marker. The marker may be a change in the amplitude of the sine wave for one or more cycles. Accordingly, the delay is determined from the time lapse between a transmitted marker and the received marker. In another implementation, the audio signal does not include a marker. Instead, the delay is determined from the delay between the received audio signals and a reference signal, or between pairs of received audio signals. For example, the zero crossing of the signals may be compared to determine the relative change per cycle. In another implementation, the audio signal includes a marker, and position is determined utilizing delay. The markers are utilized to periodically recalibrate the system if errors are introduced to the captured waveform.

In one embodiment, a sine wave having a frequency between 14-24 KHz is transmitted from a single speaker, at step 320. The sine wave is received by a first and second microphone, at step 330. The relative delay between receipt of the sine wave by the first microphone and receipt of the sine wave by the second microphone is determined, at step 340. The relative position and/or orientation of the microphone array, which is indicative of the position and/or orientation of a user's head, is determined as a function of the delay, at step 350.

In another embodiment, a sine wave having a frequency between 14-24 KHz is transmitted from a first speaker during a first period of time and a second speaker during a second period of time, at step 320. The sine wave transmitted by each of the first and second speakers is received by a first and second microphone at step 330. A plurality of relative delays between receipt of the sine wave by the first microphone and receipt of the sine wave by the second microphone is determined for each of the first and second periods of time, at step 340. The relative position and/or orientation of the microphone array is determined as a function of the plurality of delays, at step 350.

In another embodiment, a first sine wave is transmitted from a first speaker and a second sine wave is transmitted from a second speaker simultaneously, at step 320. The frequency of the first and second sine waves are different from each other, but are each between 14-24 KHz. The first and second sine waves are both received at a first and second microphone, at step 330. A plurality of relative delays, corresponding to receipt the first sine wave by the first and second microphone and receipt of the second sine wave by the first and second microphone, are determined, at step 340. The relative real-time position and/or orientation of the microphone array is determined as a function of the plurality of delays, at step 350, and may be stored in memory. When using two different sine waves simultaneously it advantageous to space the frequency of the sine waves as far apart as possible. Spacing the sine waves as far apart as possible, in terms of the frequency, readily enables isolation of the signals by the bandpass filters. Therefore, by going to a 96 Khz sample rate (14-28 KHz) the frequency spacing of the two or more sine wave signals may be increased.

Figure 4A:
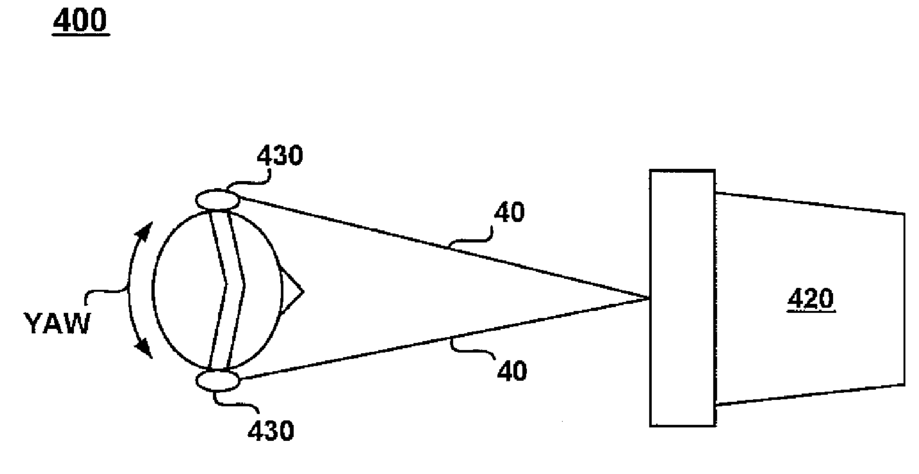
FIGS. 4A-4B shows a block diagram of an audio-based position and orientation tracking system, in accordance with one embodiment of the present invention.
Figure 4B:
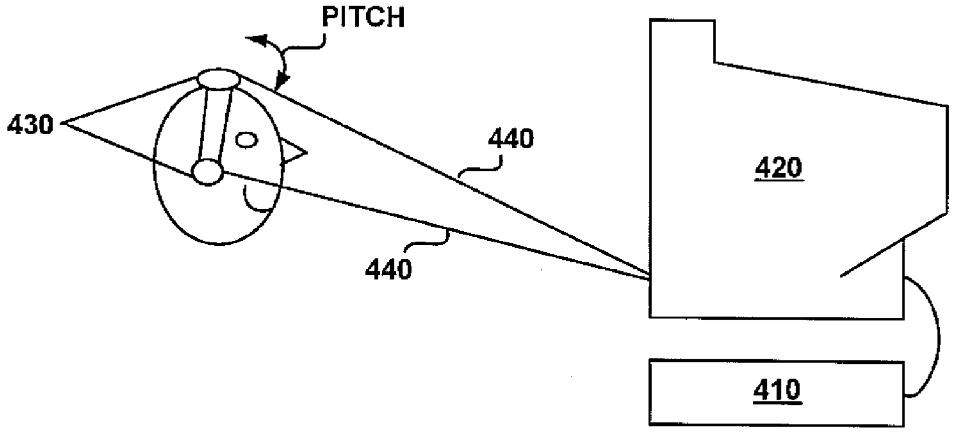

Referring now to FIGS. 4A-4B, a block diagram of an audio-based position and orientation tracking system 400, in accordance with one embodiment of the present invention, is shown. As depicted in FIGS. 4A-4B, the audio-based tracking system includes a gaming console 410, a monitor 420 (e.g., television) having one or more speakers (for example located along the bottom front portion of the television), and an array of microphones 430. Although the speakers are shown as integral to the monitor 420, it is appreciated that they may be external and/or integral to the monitor 420. The speakers are located at fixed positions and transmit a high frequency audio signal 440.

The high frequency audio signal 440 is a repetitive pattern wave (e.g., sine) selected such that it is above the audible range of a user. In one implementation the audio signal 440 is a sine wave between 14-24 Khz, which can typically be produced by conventional television audio subsystems. Furthermore, the audio signal 440 may be transmitted simultaneously with other audio signals with minimal interference.

The array of microphones 430 is mounted upon a user. The microphones 430 are lightweight, require little power and are inexpensive. Thus, the microphone array 430 is readily adapted for mounting in a headset to be worn by the user. The low power requirement and lightweight features of the microphones 430 also readily enable wireless implementations.

In one embodiment, the microphone array 430 includes two microphone. As depicted in FIG. 4A, each microphone 430 is mounted on a headset along opposite sides of the user's head (e.g., in a single horizontal plain), respectively. Each microphone 430 receives the audio signal 440 transmitted from the one or more speakers in the monitor 420. The relative position and/or orientation of the headset, and thereby the user's head, is determined as a function of the delay between the audio signal 440 received at each microphone 430. Any well-known triangulation algorithm may be applied by the system 400 to determine the position and/or orientation of the user's head. Accordingly, for the two speakers mounted along opposite sides of the user's head, the triangulation algorithm determines the yaw (e.g., single degree of freedom) of the user's head as he or she moves and/or pivots their head from side to side.

In an exemplary implementation, when the user is facing the monitor (e.g., speaker) 420, the delay between each microphone 430 will be substantially equal. When the user pivots their head 90 degree to the left, the right microphone 430 will be approximately 20 centimeters (cm) closer to the monitor 420 than the left microphone 430. The speed of sound is roughly 34,500 cm/sec. Thus, it will take 0.58 miliseconds longer to reach the left microphone 430 than the right microphone 430. Accordingly, at a 48 KHz sample rate, there will be approximately a 28 sample differential between the left and right microphones 430.

As depicted in FIG. 4B, each microphone 430 is mounted on the headset at the top and along the side of the user's head (e.g., in a single vertical plain), respectively. Each microphone 430 receives the audio signal 440 transmitted from the one or more speakers in the monitor 420. The relative position and/or orientation of the headset, and thereby the user's head, is determined as a function of the delay between the audio signal 440 received at each microphone 430. Any well-known triangulation algorithm may be applied by the system 400 to determine the position and/or orientation of the user's head. Accordingly, for the two microphones mounted at the top and along the side of the user's head, the triangulation algorithm determines the pitch (e.g., single degree of freedom) of the user's head as he or she moves and/or pivots their head up and down.

In another embodiment, the microphone array 430 includes three microphones. As depicted in FIGS. 4A-4B, each microphone 430 is mounted on the headset at the top and along opposite sides of the user's head, respectively. Each microphone 430 receives the audio signal 440 transmitted from the one or more speakers in the monitor 420. The relative position and/or orientation of the headset, and thereby the use's head, is determined as a function of the delay between the audio signal 440 received at each microphone 430. Any well-known triangulation algorithm may be applied by the system 400 to determine the position and/or orientation of the user's head. Accordingly, for the three microphones mounted at the top and along opposite sides of the user's head, the triangulation algorithm determines the yaw and pitch (e.g., two degrees of freedom) of the user's head as he or she moves and/or pivots their head from side to side and up and down.

Hence, the position and/or orientation of the user's head can be determined and tracked in real-time by the system 400. Such position and/or orientation information may be provided to the game console 420 for real-time response to interactive games executing thereon.

The accuracy of the position and/or orientation calculations can be increased by increasing the number of output sources. In doing so, two points of reference are available, and the possibility of a lower angle can be achieved with one source over another. The accuracy of the orientation calculation can also be increased by interpolating delay between samples. Increasing the capture sample rate can also increase the accuracy of the position and/or orientation calculations. At 96 KHz, the same delay is represented by twice as many samples. In addition, a given high frequency waveform can be better represented at a higher sample rate. Furthermore, by increasing the distance between microphones 430, the delay will be increased for the same orientation.

The degrees of freedom of motion of the user's head can be increased by adding additional microphones to the array 430. The degrees of freedom can also be increased by adding additional speakers.

In accordance with embodiments of the present invention, the determined position and/or orientation may be utilized as an input of a computing device. For example, the determined position and/or orientation may be utilized for feedback in a simulator or virtual reality gaming, or to control an application executing on the computing device. In addition, the determined position and/or orientation may also be utilized to control the position of a cursor (e.g., pointing device or mouse) of the computing device. Accordingly, a headset containing an array microphones may allow a user having a mobility impairment to operate the computing device.

Furthermore, embodiments of the present invention are advantageous in that the microphone array is lightweight, requires very little power, and is inexpensive. The low power requirements and the lightweight of the microphone array is also advantageous for wireless implementations. Furthermore, the high frequency of the sine wave advantageously provides sufficient resolution and reduces latency of the position and/or orientation calculations. The high frequency of the sine wave is also resistant to interference from other computer and environmental sounds.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A sound wave-based tracking system comprising:

a speaker at a fixed location for automatically transmitting a given signal combined with one or more other signals, wherein said given signal has a given frequency above an audible range and said other signals have frequencies in the audible range;

a plurality of microphones mounted upon an object for receiving said given signal; and a computing device for determining at least one of a position and an orientation of said object from a delay of said given signal received by each of said plurality of microphones, wherein said signal comprises a marker and wherein said delay is determined as a function of a delay of said marker received by each of said plurality of microphones relative to said marker of a reference signal.

2. The sound wave-based tracking system according to claim 1, wherein said plurality of microphones communicate wirelessly with said computing device.

3. The sound wave-based tracking system according to claim 1, wherein said plurality of microphones comprise two microphones and wherein said determined at least one of said position and said orientation is within a single spatial plane.

4. The sound wave-based tracking system according to claim 1, wherein said plurality of microphones comprise three microphones and wherein said determined at least one of said position and said orientation is within two spatial planes.

5. A method of tracking comprising:

transmitting simultaneously a first non-audible signal from a first speaker and a second non-audible signal from a second speaker;

transmitting an audible signal from the first speaker substantially simultaneously with the first and second non-audible signals;

receiving said first and second non-audible signals at a plurality of microphones;

determining a delay for each of said received first and second non-audible signals for each of said plurality of microphones; and determining at least one of a relative position and a relative orientation of said plurality of microphones as a function of said determined delays.

6. The method of tracking according to claim 5, wherein:

said first non-audible signal comprises a sine wave having a first frequency; and said second non-audible signal comprises a sine wave having a second frequency.

7. The method of tracking according to claim 5, further comprising controlling a cursor of a computing device as a function of said determined at least one of said relative position and said relative orientation.

8. The method of tracking according to claim 5, further comprising controlling an application executing on a computing device as a function of said determined at least one of said relative position and said relative orientation.

9. A computing system comprising:

a plurality of speakers for transmitting one or more sound waves in the audible range, and wherein a first one of the plurality of speakers automatically transmits a first signal at a first frequency above the audible range substantially simultaneously with said one or more sounds in the audible range and a second one of the plurality of speakers automatically transmits a second signal at a second frequency above the audible range substantially simultaneously with the first signal and said one or more sounds in the audible range;

a plurality of microphones mounted on an assembly for receiving said first and second signals; and a computing device coupled to control said speakers and coupled to receive said first and second signals from each of said plurality of microphones, said computing device for determining at least one of a relative position and a relative orientation of said assembly based on delay differences of said first and second signals received from each of said plurality of microphones.

10. The computing system as described in claim 9, wherein said computing device is a personal computer and wherein said personal computer is wirelessly coupled to said plurality of microphones.

11. The computing system as described in claim 9, wherein said computing device is a game console and wherein said game console is wirelessly coupled to said plurality of microphones.

12. The computing system as described in claim 9, wherein said plurality of microphones comprise two microphones and wherein said determined at least one of said relative position and said relative orientation is within a single spatial plane.

13. The computing system as described in claim 9, wherein said plurality of microphones comprise three microphones and wherein said determined at least one of said relative position and said relative orientation is within two spatial planes.

14. The computing system as described in claim 9, wherein said computing device comprises a display screen and wherein said computing device translates said determined at least one of said relative position and said relative orientation into a cursor position on said display screen.

15. The computing system as described in claim 9, wherein said sound wave is a sine wave.

16. A sound wave-based tracking system comprising:

a speaker at a fixed location for automatically transmitting a given signal combined with one or more other signals, wherein said given signal has a given frequency above an audible range and said other signals have frequencies in the audible range;

a plurality of microphones mounted upon an object for receiving said given signal; and a computing device for determining at least one of a position and an orientation of said object from a delay of said given signal received by each of said plurality of microphones, wherein said delay is determined as a function of a time delay of said signal received by each of said plurality of microphones relative to a reference signal.

17. The sound wave-based tracking system according to claim 16, wherein said sound wave is a sine wave.

18. The sound wave-based tracking system according to claim 16, wherein said computing device comprises a display screen and wherein said computing device translates said determined at least one of said relative position and said relative orientation into a cursor position on said display screen.

19. The sound wave-based tracking system according to claim 16, wherein said plurality of microphones communicate wirelessly with said computing device.

* * * * *